US006984407B2

(12) United States Patent
Wolt et al.

(10) Patent No.: US 6,984,407 B2
(45) Date of Patent: *Jan. 10, 2006

(54) HIGH SATIETY INDEX BREAD

(75) Inventors: Michael J. Wolt, Gretna, NE (US); Elizabeth A. Arndt, Omaha, NE (US); John R. Hinchik, Omaha, NE (US)

(73) Assignee: ConAgra Foods, Inc., Omaha, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 10/797,243

(22) Filed: Mar. 9, 2004

(65) Prior Publication Data

US 2004/0170738 A1    Sep. 2, 2004

Related U.S. Application Data

(63) Continuation-in-part of application No. 10/001,464, filed on Oct. 31, 2001, now Pat. No. 6,706,305.

(51) Int. Cl.
*A21D 13/00* (2006.01)
(52) U.S. Cl. ........................ 426/549; 426/94; 426/615; 426/618
(58) Field of Classification Search ................ 426/94, 426/549, 615, 618
See application file for complete search history.

(56) References Cited

U.S. PATENT DOCUMENTS

| | | | |
|---|---|---|---|
| 4,282,319 A | 8/1981 | Conrad | |
| 4,377,602 A | 3/1983 | Conrad | |
| 4,379,174 A | 4/1983 | Radlove | |
| 4,568,557 A | 2/1986 | Becker et al. | |
| 4,711,786 A | 12/1987 | Schmidt | |
| 4,741,907 A | 5/1988 | Furuhashi | |
| 4,777,045 A | 10/1988 | Vanderveer et al. | |
| 4,961,937 A | 10/1990 | Rudel | |
| 4,968,694 A | 11/1990 | Madsen et al. | |
| 5,151,283 A | 9/1992 | Foehse et al. | |
| 5,223,298 A | 6/1993 | Wullschleger et al. | |
| 5,227,248 A | 7/1993 | Wullschleger et al. | |
| 5,246,723 A | 9/1993 | Kameyama et al. | |
| 5,281,432 A | 1/1994 | Zallie et al. | |
| 5,364,652 A | 11/1994 | Ohkuma et al. | |
| 5,403,610 A | 4/1995 | Murphy et al. | |
| 5,464,644 A | 11/1995 | Wullschleger et al. | |
| 5,480,669 A | 1/1996 | Zallie et al. | |
| 5,695,803 A | 12/1997 | Sharp et al. | |
| 5,698,256 A | 12/1997 | Stilling | |
| 5,776,887 A | 7/1998 | Wibert et al. | |
| 5,792,506 A | 8/1998 | Buchanan et al. | |
| 5,795,606 A | 8/1998 | Lapré et al. | |
| 5,807,727 A | 9/1998 | Uchida et al. | |
| 5,843,927 A | 12/1998 | DeLuca et al. | |
| 5,972,399 A | 10/1999 | Lapré et al. | |
| 6,210,702 B1 | 4/2001 | Samman | |
| 6,210,722 B1 | 4/2001 | Wullschleger et al. | |
| 6,248,375 B1 | 6/2001 | Gilles et al. | |
| 6,503,555 B1 | 1/2003 | Katta et al. | |
| 6,706,305 B2 * | 3/2004 | Wolt et al. | 426/549 |

FOREIGN PATENT DOCUMENTS

WO    WO 94/28743    12/1994

OTHER PUBLICATIONS

Newman, R.K. and Newman, C.W., Barley as a Food Grain, *Cereal Food World*, Sep. 1991, pp. 800-805, vol. 36, No. 6, American Association of Cereal Chemists, Inc., United States of America.

C. McWard, "Baking and Snack", Integrating value: specialty flours and grains, 1995. Abstract.

Xue, Q., et al., Influence of Hulless, Waxy Starch and Short-awn Genes on the Composition of Barleys, *Journal of Cereal Science*, 1997, pp. 251-257, No. 26, Academic Press Limited, United States of America.

Hallfrisch, L. and Behall, K.M., Improvement in Insulin and Glucose Responses Related to Grains, *Cereal Food World*, Feb. 2000, pp. 66-69, vol.45, No. 2, American Association of Cereal Chemists, Inc., United States of America.

Holt, S.H.A., et al., The Effects of equal-energy portions of different breads on blood glucose levels, feelings of fullness and subsequent food intake, Journal of The American Dietetic Association, Jul. 2001, pp. 767-773, vol. 101, No. 7.

* cited by examiner

*Primary Examiner*—Lien Tran
(74) *Attorney, Agent, or Firm*—Bingham McCutchen LLP

(57) ABSTRACT

A baked bread product having an increased or high satiety index (SI) is provided. The high SI baked bread product ingredients include a wheat flour product, a grain/seed source of soluble fiber, and a processed source of soluble fiber. The bread product has a total soluble fiber content of at least about 0.8 wt. % on a 42% moisture basis and a total beta-glucan content of at least about 0.2 wt. % on a 42% moisture basis. The high SI bread produce may also have a low glycemic index (GI).

50 Claims, No Drawings

HIGH SATIETY INDEX BREAD

CROSS-REFERENCE TO RELATED APPLICATION

The present application is a Continuation-In-Part (CIP) of patent application Ser. No. 10/001,464, filed Oct. 31, 2001 now U.S. Pat. No. 6,706,305, priority of which is hereby claimed under 35 U.S. §120, and which is incorporated herein by reference.

FIELD OF THE INVENTION

The present invention relates generally to bread products, and more particularly, to bread products having high or increased satiety or fullness impressions.

BACKGROUND

Different food items provide different satiety or fullness impressions. In other words, a person who consumes equal-energy portions of different food items may feel stronger sensations of fullness, satisfaction or satiety. Consequently, after consuming lower satiety food items, shortly thereafter, the person may proceed with eating additional or larger portions of food. However, after consuming increased or higher satiety food items that have stronger sensations of fullness, the person may forgo or delay eating additional portions or consume smaller portions, thereby reducing the total number of calories that are consumed. Thus, increased or higher satiety food items may partially reduce the quantity of food a person consumes and contribute to healthier diets, thereby assisting with weight control and reducing the risk of diabetes, heart disease, certain cancers and other weight-related disorders.

Bread is a staple food item in many diets. It would be desirable to produce a bread product that provides high satiety or fullness impressions compared to lower satiety breads, such as conventional white or sandwich breads. As a result, a person who consumes higher satiety breads may consume fewer calories, thereby contributing to a healthier diet and reducing the risk of various diseases. These enhancements to bread products should be achieved while not significantly sacrificing quality characteristics, including density, texture, flavor and nutrition of the bread.

SUMMARY

In accordance with one embodiment, a baked bread product having a high satiety index includes a wheat flour product, a grain/seed source of soluble fiber, and a processed source of soluble fiber. The bread product has a total soluble fiber content of at least about 0.8% of the weight of the baked bread product on a 42% moisture basis and a total beta-glucan content of at least about 0.2% of the weight of the baked bread product on a 42% moisture basis. The amounts of the grain/seed source of soluble fiber and the processed source of soluble fiber are selected to provide a high satiety index.

In accordance with another embodiment, a composition suitable for making a high satiety bread product includes a wheat flour product, a grain/seed source of soluble fiber, and a processed source of soluble fiber. The composition contains an amount of grain, nuts, and/or seeds of sufficient size so that at least about 20% of the total weight of the grain, nuts and/or seeds in the composition is retained by a sieve having a 12 US mesh sieve size. The amounts of the grain/seed source of soluble fiber and the processed source of soluble fiber are selected to provide a high satiety index.

In yet a further embodiment, a baked bread product has both a high satiety index and a low glycemic index. The bread product includes a wheat flour product, a grain/seed source of soluble fiber, and a processed source of soluble fiber. The product has a total soluble fiber content of at least about 0.8% of the weight of the baked bread product on a 42% moisture basis and a total beta-glucan content of at least about 0.2% of the weight of the baked bread product on a 42% moisture basis. The amounts of the grain/seed source of soluble fiber and the processed source of soluble fiber are selected to provide both a high satiety index and a glycemic index of about 55 or less.

DETAILED DESCRIPTION

Embodiments of a baked bread product having an increased or high satiety index (SI) relative to conventional bread products, such as white or sandwich breads, and a composition useful for making a high SI bread product. A high SI bread product according to one embodiment contains a wheat flour product, a grain/seed source of soluble fiber, and a processed source of soluble fiber. For example, in one embodiment, a bread product has a total soluble fiber content of at least about 0.8 wt. % on a 42% moisture basis and a total beta-glucan content of at least about 0.4 wt. % on a 42% moisture basis. In another embodiment, a bread product contains a wheat flour product, a grain/seed source of soluble fiber, and a processed source of soluble fiber. The composition is sufficiently coarse such that at least about 20 wt. %, preferably at least about 40 wt. %, of the total of any grain, nuts and seeds (which excludes whole wheat flour) in the composition is retained by sieve having a 12 US mesh sieve size.

Satiety generally refers to a sensation or impression of fullness that a person experiences after eating a food item. Low satiety foods are generally considered to provide lesser and/or feelings of fullness for a shorter time after a certain quantity of calories are consumed, whereas foods with higher satiety responses are generally considered to provide stronger and/or feelings of fullness for a longer time after similar quantities of calories are consumed. Accordingly, for purposes of diet and weight control, food items with increased or high satiety, such as high satiety bread products, may be advantageous relative to bread products having lower satiety responses, such as standard white sandwich breads, since a person consuming a high satiety food item typically experiences greater sensations of fullness and/or feels satisfied for longer periods of time given similar quantities of calories. As a result, a person consuming high satiety bread products may forgo eating additional quantities of food or subsequently consume lesser quantities of food, thereby reducing the number of calories consumed.

Specific satiety effects may be subjective and vary from person to person due to, for example, digestion rates, however, satiety impressions or sensations of fullness relative to other "reference" or "baseline" lower satiety breads, such as white breads, are generally consistent. Persons consuming increased or high-satiety bread products may, therefore, be more likely to delay or forgo consuming additional quantities of food.

Although not necessarily related, high SI bread products and compositions may also provide a low glycemic index (GI). A GI value is a relative indication of the effect of a particular food product on a person's blood sugar, e.g., an area under a curve of the glucose response to a carbohydrate-containing food compared to either a specific glucose dose or a specific amount of white bread. Research has shown that diets based on low GI foods can also reduce the risk of various diseases, improve blood glucose control in people with diabetes, reduce high blood fat levels, and be useful for weight control.

In one embodiment a composition useful for making an increased or high SI bread product contains a wheat flour product, a grain/seed source of soluble fiber, and a processed source of soluble fiber. The composition ingredients are selected so that the composition is sufficiently coarse such that at least about 20 wt. %, preferably at least about 40 wt. %, of the total of any grain, nuts and seeds (which excludes whole wheat flour) in the composition is retained by sieve having a 12 US mesh sieve size.

In another embodiment, the wheat flour product includes whole wheat flour and/or wheat flour. Preferably the wheat flour product ingredients are selected so that the product comprises at least about 50 wt. % whole wheat flour, more preferably at least about 100 wt. % whole wheat flour, based on the total weight of the wheat flour product (i.e., the total amount of flour in the baked bread product or the bread composition). The wheat flour product is included in the baked bread product in an amount preferably ranging from about 30 wt. % to about 50 wt. %, more preferably from about 40 wt. % to about 45 wt. %. If desired, the composition and bread product can further comprise one or more other flours, including rye flour, whole grain rye flour, durum flour, whole grain durum flour, barley flour, whole grain barley flour, oat flour, whole grain oat flour, spelt and whole grain spelt flour.

Whole wheat flour is preferred because it is higher in fiber than, for example, wheat flour or rye flour. The baked bread product of the invention preferably contains at least about 6 wt. %, more preferably at least about 7 wt. %, still more preferably from about 7.2 wt. % to about 8.5 wt. %, yet more preferably about 7.9 wt. % total dietary fiber, on a 42% moisture basis, which is based on the total moisture content of the baked bread product. Additionally, the bread product preferably has a soluble fiber content of at least about 0.8 wt. %, more preferably at least about 1.0 wt. %, still more preferably from about 1.0 wt. % to about 1.6 wt. %, even more preferably about 1.3 wt. %, on a 42% moisture basis. The total insoluble fiber content of the baked bread product preferably ranges from about 6.0 to about 6.9 wt. %. The baked bread product has a total beta-glucan content of at least about 0.2 wt. %, more preferably from about 0.4 to about 0.8 wt. %, on a 42% moisture basis.

A high SI bread composition preferably has a total soluble fiber content of at least about 0.7 wt. %, more preferably at least about 0.9 wt. %, still more preferably from about 0.9 wt. % to about 1.4 wt. %, even more preferably about 1.1 wt. %. The composition preferably has a total beta-glucan content of at least about 0.2 wt. %, more preferably at least about 0.4 wt. %.

Whole wheat flour contains more dietary fiber than wheat flour. Accordingly, to the extent that the amount of whole wheat flour in the wheat flour product decreases, it is desirable to supplement the bread product and composition with one or more sources of processed fiber, including, but not limited to, oats, soy, corn, wheat, barley, peas and cottonseed. In one embodiment, the composition and bread product include soy protein concentrate or soy protein isolate extruded into crisp pieces, clusters or nuggets. In addition, or in the alternative, the fiber content of the bread product or composition can be increased by increasing the amount of grain/seed sources of soluble fiber, which are discussed in more detail below.

Some embodiments of high SI bread compositions may also provide a low GI value. The presence and type of the soluble fiber in the bread can cause the bread to be digested slower. Thus, increasing the amount of certain types of soluble fiber can aid in decreasing the GI of a high SI bread. Notably, more viscous soluble fiber sources have been found to be more beneficial in aiding to lower the GI value. However, in selecting the desired amount of soluble fiber in the bread, it should be recognized that there is a tradeoff between lowering the GI value and enhancing the bread quality characteristics, namely, reducing the density of the bread. For example, a bread having 1.6% soluble fiber would likely have a lower GI value than a bread having 1.3% soluble fiber, but the 1.3% soluble fiber bread would be less dense. When the baked bread product of the invention is in the form of bread or a roll, preferably it has a density (specific volume) from about 3.5 to about 4.5 cc/gram, more preferably from about 3.5 to about 4.0 cc/gram. When the baked bread product is in the form of a bagel, preferably it has a density from about 2.5 to about 3.5 cc/gram, more preferably from about 2.75 to about 3.25 cc/gram.

To improve the bread quality characteristics, including providing increased or high SI values and, in some caseslow GI values, the bread includes both a grain/seed source of soluble fiber and a processed source of soluble fiber. If only a processed source of soluble fiber is included, a relatively large amount would need to be used to achieve the desired soluble fiber content, thereby reducing the bread quality.

The grain/seed source of soluble fiber may be any grain-type, nut-type or seed-type source of soluble fiber or a mixture thereof. Examples of suitable grain-type and seed-type sources of soluble fiber include wheat, rye, oats, barley (such as standard barley and waxy hulless barley, for example, the merlin, waxbar and prowashonupana varieties), triticale, corn, soy, rice, flaxseeds, sunflower seeds, millet, buckwheat, amarath, spelt and mixtures thereof. Examples of suitable nut-type sources include almonds, hazelnuts, walnuts, pecans and mixtures thereof. The inclusion of the grain/seed source of soluble fiber not only increases the nutritional value of the bread, but can enhance the flavor and/or texture of the bread. The grain/seed source of soluble fiber is preferably high in beta-glucan. Examples of grain/seed source of soluble fiber high in beta-glucan include oat, oat bran, rye, barley, barley bran and flaxseed. The grain/seed source of soluble fiber is present in the composition in a total amount preferably ranging from about 4 to about 12 wt. %, more preferably ranging from about 6 to about 11 wt. %, still more preferably from about 8 to about 10 wt. %.

The processed source of soluble fiber is a type of soluble fiber other than a grain/seed source of soluble fiber, as defined above. Examples of processed sources of fiber suitable for use in the invention include refined gums (including partially hydrolyzed gums), extracts high in pectin, herb extracts (such as psyllium), beta-glucan extracts from grains and mixtures thereof. Preferred refined gums include guar gum (including partially hydrolyzed), apple pectin and citrus pectin. A particularly preferred extract that is high in pectin is apple pectin concentrate. Beta-glucan extracts from grains that are useful in the invention include oat beta-glucan concentrate, barley beta-glucan concentrate, and rye beta-glucan concentrate. The processed source of soluble fiber is present in the composition in a total amount preferably ranging from about 0.05 to about 0.5 wt. %, more preferably ranging from about 0.05 to about 0.2% wt. %, still more preferably from about 0.1 to about 0.015 wt. %. However, the amount of the processed source of soluble fiber is particularly dependent on the particular type of processed source of soluble fiber, and thus the amount can vary as desired.

To slow digestion of the baked bread product and to provide enhanced satiety impressions, the bread composition should be sufficiently coarse. In other words, the composition should contain an amount of grain, nuts, and/or seeds of sufficient size so that at least about 20 wt. %, preferably at least about 40 wt. %, of the total of any grain, nuts and seeds in the composition is retained by a sieve having a 12 US mesh sieve size. In a particularly preferred embodiment, at least 75 wt. %, more preferably at least about 95 wt. %, of the total of any grain, nuts and seeds in the composition is retained by a sieve having a 20 US mesh sieve size. The coarseness of the grain, nuts and seeds can be enhanced, for example, by using coarse flour, using whole or cracked grains and/or by including soy protein isolate extruded into crisp pieces, clusters or nuggets.

The bread composition preferably contains other suitable bread ingredients, including yeast, vital wheat gluten, sweetener, oil, lecithin, salt, and additives. Examples of suitable sweeteners include sucrose, high fructose corn syrup, brown sugar, honey, molasses, malt syrup or powder, raisin juice concentrate, fructose, fruit juice, and fruit juice concentrates. Preferably the bread composition does not include dextrose (glucose) as a sweetener, and sweeteners that contain high levels of dextrose, such as high fructose corn syrup, need to be limited. Preferably the majority of the added sugar in the composition will be in the form of sucrose or fructose. The bread product can also include fruit and/or flavorings to enhance the flavor or texture of the product. However, if glycemic effects are a concern, the type and amount of fruit should be controlled so as not to adversely impact the GI value. If desired, dough conditioners and/or preservatives can be included in the bread composition, as would be understood by one skilled in the art.

Embodiments of high SI baked bread products can made by various suitable methods, including the sponge and dough method and the straight dough method, as well as modifications of these methods. The sponge and dough method typically produces breads with better flavor and better shelf-life characteristics compared to breads made by the straight dough method. Optimal high SI bread quality and shelf-life are obtained when the compositions according to the invention are made by the sponge and dough method where the grain/seed and non-grain/seed sources of soluble fiber are added in the sponge stage of the process.

In the sponge and dough method, a two-step mixing process is utilized. Initially part of the ingredients (part of the total flour, grain mix, yeast and water) of the high SI bread composition are mixed into a "sponge" and allowed to ferment for approximately 3 to 4 hours at 86° F., 85% relative humidity. After the sponge fermentation is complete, the remainder of the ingredients are added to the sponge, and the second mixing step is conducted to form a dough. The dough is mixed at a suitable speed and for a suitable time to produce full development of the resulting dough product. The dough is allowed to rest in bulk for approximately ten minutes prior to being mechanically divided and scaled to the appropriate weight. The divided dough pieces are rounded and allowed to rest for about 5 to 10 minutes prior to machine moulding. The moulded dough pieces are placed in an appropriate pan for the given dough weight and placed in a proof box, preferably set at about 110° F. with proper humidity. After the dough has proofed to the appropriate height for the given pan, the pans are loaded into an oven and baked at approximately 350 to 400° F. for about 20 to 30 minutes, depending on the weight of the dough and the type of oven, as would be recognized by one skilled in the art. The baked bread products are immediately depanned and allowed to cool for a sufficient period of time, for example, one hour, before being bagged.

Alternatively, if the straight dough process is utilized, all of the ingredients in the high SI bread composition are mixed into a dough in a single mixing step, and the sponge is eliminated. The dough is allowed to ferment for a suitable period of time, preferably from about 30 minutes to about 2 hours, more preferably about 1 hour, prior to being divided, scaled and processed as indicated above for the sponge and dough method. When using the straight dough method, it is likely that the amount of water and yeast may need to be increased somewhat relative to what is used when the sponge and dough method is utilized.

EXAMPLES

Examples 1 to 4

Four bread products having increased or high SI values relative to standard white breads were made having the compositions as set forth in Table 1, where each component is indicated as a percentage of the total wheat flour (percentage on a total flour basis). A separate composition is listed for the grain mix used in each example, and in that case, the percentage is based on the total weight of the grain mix (total grain mix basis). For each bread product, the sponge and dough method was employed. For each sponge, the liquid ingredients followed by the dry ingredients were placed in a Hobart 12 quart mixer with a McDuffy bowl attachment. The sponges were mixed on low speed for 1 min and then on high speed for 4 min at a set temperature of about 74° F. The sponges were allowed to ferment in a cabinet for 3 hours at 86° F., 85% relative humidity. The sponges were then introduced to a mixing bowl containing the dough ingredients and mixed with the dough ingredients for 1 minute on low speed and 8 minutes on high speed, with a finished dough product temperature of 80° F. The dough products were divided into 27.5 ounce pieces, round by hand and allowed to rest for five minutes prior to sheeting/moulding. The dough products were sheeted/moulded on an Oliver model 645-24B sheeter/moulder with the top sheeting roll on setting 2.2 and the bottom sheeting roll on setting 3.2. The pressure places and guides were adjusted to give proper moulding and the proper length dough piece for the pan. The pan utilized has the following dimensions: top inside—8.75 inches×5.5 inches; bottom outside 8.13 inches×5 inches; and depth—3 inches. The molded dough was placed in the pan seam side down, and the panned dough was placed in a proof cabinet at 110° F., 85% relative humidity. The dough products were removed from the cabinet after the dough obtained a height of ½ inch above the pan, which took approximately one hour. The dough products were baked in a rotating gas oven at 400° F. for about 28 minutes. The baked bread products were immediately depanned and allowed to cool on racks at room temperature for approximately 45 minutes prior to slicing on a reciprocating slicer (½ inch slice thickness) and bagging in polyethylene bags.

TABLE 1

| | Ex. 1 | Ex. 2 | Ex. 3 | Ex. 4 |
|---|---|---|---|---|
| Sponge | | | | |
| Stoneground Whole Wheat Flour - Fine | 60.0% | 60.0% | | |
| Stoneground Whole Wheat Flour - Coarse | | | 35.5% | 40.0% |
| Grain Mix | 25.0% | 25.0% | 25.0% | 25.0% |
| Vital Wheat Gluten | 14.0% | 14.0% | 7.0% | 7.0% |
| Compressed Yeast | 3.0% | 3.0% | 3.2% | 3.2% |
| Ascorbic Acid | 30 ppm | 30 ppm | 30 ppm | 30 ppm |
| Water | 66.5% | 66.5% | 43.5% | 48.0% |
| Dough | | | | |
| Stoneground Whole Wheat Flour - Fine | 40.0% | 40.0% | 64.5% | 40.0% |
| Stoneground Whole Wheat Flour - Coarse | | | | 20.0% |
| Brown Sugar, Light | 11.6% | 11.6 | 8.0% | 13.0% |
| Honey | 5.4% | 5.4% | 4.0% | 3.0% |
| Raisin Juice Concentrate | 2.3% | 2.3% | 3.5% | |
| Molasses, Dry | | | 1.4% | |
| Yeast | 2.0% | 2.0% | 1.0% | 2.0% |
| Salt | 2.0% | 2.0% | 2.0% | 2.0% |
| Ascorbic Acid | 120 ppm | 120 ppm | 120 ppm | 120 ppm |
| Water | 27.5% | 27.5% | 48.5% | 44.0% |
| Grain Mix | | | | |
| Waxy Hulless Barley, cracked (Merlin) | 33.2% | | 50.0% | 39.0% |
| Waxy Hulless Barley, cracked (Prowashonupana) | | 33.5% | | |
| Rye, cracked | 21.4% | 21.4% | | 2.5% |
| Wheat, crushed | | | 42.2% | |
| Soy, grits (full fat type) | | | | 7.5% |
| Oats, cracked | 10.6% | 10.6% | | |
| Oats, steel cut | | | | 3.2% |
| Corn Grits, coarse | 10.6% | 10.6% | | |
| Flaxseed, whole | 10.6% | 10.6% | | 10.0% |
| Triticale, cut | 7.1% | 7.1% | | 2.5% |
| Canola oil | 4.3% | 4.3% | 4.0% | 4.0% |
| Lecithin (Blendmax K, Central Soya) | | | 2.5% | 2.5% |
| Lecithin (Centrolux F, Central Soya) | 1.0% | 1.0% | | |
| Apple Extract (Herbapeck SF08) | 1.25% | | 1.3% | 1.3% |
| Guar Gum | | 0.9% | | |
| GI VALUE (Glucose = 100) | 44 ± 5 | 50 ± 3 | 52 ± 3 | 52 ± 4 |

The fine stoneground whole wheat flour used in the exemplary compositions had the following granulation:
On US 20 W: 0% Maximum
On US 40 W: 5.0%±5.0%
On US 60 W: 10.0%±5.0%
On US 80 W: 20.0%±5.0%
On US 20 W: 15.0%±5.0%
Pan: 50.0%±5.0%

The coarse stoneground whole wheat flour used in the exemplary compositions had the following granulation:
On US 20 W: 20.0%±5.0%
On US 40 W: 30.0%±5.0%
On US 60 W: 15.0%±5.0%
On US 80 W: 10.0%±5.0%
On US 20 W: 5.0%±5.0%
Pan: 20.0%±5.0%

This specification describes one manner of determining SI values, and GI values for the test bread products. Persons of ordinary skill in the art will appreciate that other methods, techniques and SI and GI determinations can be utilized. Accordingly, the following description of determining and analyzing SI and GI values is provided for purposes of explanation, not limitation.

SI Test Parameters

Persons of ordinary skill in the art will appreciate that various satiety index determinations can be utilized. For example, satiety index determinations can be based on subjective rating criteria and/or the amount of food that is consumed following consumption of a test bread.

One suitable protocol for determining satiety index values is described in Susanna H. A. Holt et al., "A Satiety Index of Common Foods," European Journal of Clinical Nutrition (1995), pp.675–690, the contents of which are incorporated by reference herein, and Susanna H. A. Holt et al., "The Effects of Equal-Energy Portions of Different Breads on Blood Glucose Levels, Feelings of Fullness and Subsequent Food Intake," Journal of the American Dietetic Association (July, 2001), Vol. 101, No. 7, pp. 767–773, the contents of which are also incorporated by reference herein.

In this exemplary protocol, test subjects are provided isoenergetic or equal calorie portions of test breads (e.g., 240 kcal portions) and the same portion of a reference bread, e.g., a conventional white bread. The test subjects are also provided an amount of water to drink to aid ingestion of the bread products. Subjective satiety ratings are obtained from the test subjects following consumption of the breads. For example, satiety ratings can be obtained at time "0" or shortly after consuming the bread product, and periodically, e.g., every 15 minutes, for a predetermined amount of time, e.g., 120 minutes.

One suitable rating scale may be a seven-point rating scale (ranging from extremely hungry to extremely full). The satiety index score is calculated by dividing the area under the satiety response curve (AUC) for the test foods by the individual's AUC for white bread (which has a SI reference value of 100), and multiplying that number by 100 to express the value as a percentage. The resulting percentage is relative to the reference white bread, which has a satiety index value of 100%. Thus, the satiety responses of the high SI breads are expressed as a percentage of that produced by white bread. Satiety index values can serve as an indicator of the amount of food that will be subsequently consumed. For example, persons may consume less food following consumption of breads with higher SI values, and persons may consume greater quantities of food following consumption of breads with lower SI values.

In an alternative embodiment, a satiety index protocol utilizes serving sizes that are based on a predetermined quantity of available carbohydrates (e.g., 50 grams) and based on subsequent calorie consumption, rather than equal calorie portions of a bread product as previously described. In this alternative protocol, satiety index values are determined based on the difference between the number of calories that are consumed by a test subject following consumption of a test bread relative to the amount of calories that are consumed following consumption of a control food item. The time span between consuming an initial control or test bread sample and a subsequent meal, e.g., "lunch," can be about two to four hours, preferably about two hours. SI values are determined by calculating the difference in calories consumed during the subsequent meal. Further details regarding possible test parameters and other factors that can impact SI values are discussed below.

One or more control food items are used to establish a baseline for the satiety index determinations. Suitable control food items include a glucose solution and/or white bread. For example, one suitable glucose solution may include 50 grams pure glucose sugar (dextrose; D-glucose), Sigma-Aldrich chemical company, Castle Hill, NSW, Australia) dissolved in 250 ml of water.

The bread products that are compared to the control food items may be the bread products set forth in Examples 1–4 above. Predetermined samples of the control food items and the test bread products are prepared, e.g., 50 gram available carbohydrate portions. For purposes of explanation, this particular protocol involves six total portions—two control portions and four test bread portions. If necessary, the test bread portions may be colored to mask differences in appearance relative to other test bread portions and the control portions. The subjects are not aware of the identity of the control and bread portions.

The test subjects may be, for example, 12 adult non-smoking men and 12 adult non-smoking women, preferably between 30–60 years of age. The test subjects preferably have Body Mass Indexes (BMIs), on average, typical of the United States adult population or other suitable test region. Test subjects having diabetes and other chronic health problems, that use prescription medications that interfere with the study or fiber supplements, or that use vitamin/mineral supplements exceeding 100% of RDA guidelines are preferably excluded so that these factors do not interfere with satiety test results.

The subjects fast overnight and are provided with one of the six portions the following morning based on a random selection. Before consuming the portion, a fasting blood sample is obtained from each subject. Each subject then consumes the 50 gram portion. Thereafter, additional blood samples are obtained, e.g., after 15, 30, 45, 60, 90 and 120 minutes, or other suitable periods and durations. Glucose levels in each blood samples are determined. During the 120 minute duration, the test subjects do not consume other food items.

After the 120 minute test or other duration, the subjects are provided with a free-choice "lunch." The lunch offers the test subjects a wide variety of available food items. For purposes of this study, the lunch foods are pre-portioned in individual, standard serving sizes that have been pre-weighed. The test subjects are permitted to select as many pre-portioned food items as the like, and the food items selected by each subject are recorded. Uneaten food items are recorded and weighed. The tests for the other control and bread samples are repeated and separated by about one week, resulting in a total test duration for two control and four bread samples of about six weeks.

For each of the six tests, the energy intake and macronutrient compositions during the "lunch" sessions following consumption of the test bread and control food items are calculated by determining the difference between the amount of food consumed and any uneaten foods. These calculations are used to determine SI values. Thus, the SI values are relative values compared to reference or baseline control food items.

Additional factors may be considered in determining SI values, including test subject questionnaires or rankings, body parameters, and blood glucose values of the blood samples. For example, a satiety questionnaire may be administered prior to the "lunch" in order to further assess the hunger level of each subject. These rankings can be assigned a particular weight to impact SI values. Additionally, before the test portions are administered, the weight, height, anthropometric and body compositions of each test subject can be measured. Body compositions can be determined using, for example, bioelectrical impedance. These body measurements can be repeated on each test day, i.e., each day that a test bread product or a control item is consumed. Changes in these measurements can be assigned a particular weight to impact SI values. Persons of ordinary skill in the art will recognize that other testing parameters and factors can be utilized to determine SI values. Accordingly, the previously described protocol is provided for purposes of illustration, not limitation.

GI Test Parameters

Persons of ordinary skill in the art will also appreciate that GI values can be determined using similar test parameters as discussed above. For example, one manner of determining GI values for the baked bread products of the above examples, set forth in Table 1 above, is the methodology utilized by Sydney University's Glycaemic Index Research Service (Sydney, Australia), as described in U.S. application Ser. No. 10/001,464, filed Oct. 31, 2001, which is incorporated herein by reference.

Healthy, non-smoking human subjects were selected. Pure glucose sugar (dextrose; D-glucose), Sigma-Aldrich chemical company, Castle Hill, NSW, Australia) dissolved in water was used as the reference food. The reference food was prepared the day before required by dissolving 50 grams of pure glucose sugar in a glass of 250 mL of water, which was then covered and stored overnight in a refrigerator. The solution was brought to room temperature about 30 minutes before serving.

The test breads were weighed, wrapped and stored in a freezer. The evening before a bread was required for testing the next morning, a portion of the bread was taken from the freezer and left to defrost overnight. The next morning each defrosted portion of bread was presented to the test subject at room temperature. The test subjects fasted for 10 to 12 hours the night before their test. A fasting blood sample was obtained from each subject prior to consumption of the test bread. The reference food and the test breads were all served in amounts providing 50 grams of available (digestible) carbohydrate.

To determine GI values, after the subject consumed the test bread or reference food, additional blood samples were taken at regular intervals over two hours to measure the total two-hour blood glucose response. The two-hour blood glucose response for the test food was compared to the two-hour blood glucose response produced by the same amount of available carbohydrate in the form of pure glucose sugar, the reference food, which has a GI value equal to 100. The concentration of glucose in the plasma component in each blood sample was analyzed in duplicate using the glucose hexokinase enzymatic method (Roche Diagnostic Systems, Sydney, Australia) and an automatic centrifugal spectrophotometric analyzer (Cobas Fara, Roche Diagnostics, Basel, Switzerland). The glucose concentrations in the blood samples for a given test bread or for the reference food were then used to graph a two-hour blood glucose response curve, which represents the subject's total two-hour glycemic response to that food. The area under this two-hour blood plasma glucose response curve (AUC) was calculated in order to obtain a single number, which indicates the magnitude of the total blood glucose AUC during the two-hour period. A GI value for the test food was then calculated by dividing the two-hour blood glucose response value for the test food by the subject's average two-hour blood glucose AUC value for the reference food and multiplying by 100 to obtain a percentage score. For each exemplary bread, the indicated GI value is the mean of 10 subjects' individual GI scores for the bread, with the standard deviation indicated. A low GI bread product is generally considered to have a GI value of about 55 or less, preferably about 50 or less, compared to, for example, white sandwich bread, which has a GI value of about 70 to 80, based on glucose having a GI value of 100. As used herein, GI value refers to the mean value based on ten test subjects as calculated based on glucose equaling 100.

Example 5

A high SI bagel product was made having the composition set forth in Table 2, where each component is indicated as a percentage of the total wheat flour (percentage on a total flour basis). The liquid ingredients followed by the dry ingredients were placed in a Hobart 12 quart mixer with a McDuffy bowl attachment and mixed on low speed for 2 minutes and then on medium speed for 6 min with a water temperature of about 70° F. and a dough temperature of about 78 to 80° F. The dough products were divided into 3.5 ounce pieces, rounded by hand and allowed to rest prior to sheeting on a laboratory dough sheeter with a 9/16" gap between rollers. The dough was shaped into bagels, placed on a baking sheet, dusted with coarse cornmeal, and then held in a closed environment at 44° F. for 24 hours. The shaped bagels were cooked in a bagel boiler at 204° F. for thirty seconds on each side and then placed in a proof cabinet at 110° F., 95% relative humidity. The bagel products were removed from the cabinet after approximately 40 to 45 minutes. The bagel products were baked in a rotating gas oven at 400° F. for about 20 minutes.

The previously described SI testing parameters can also be used to test the composition of the high SI baked bagel product of this example, set forth in Table 2 below. GI values were also determined in a similar manner as Examples 1 to 4 described above.

TABLE 2

| Dough | |
|---|---|
| Stoneground Whole Wheat Flour - Fine | 60.0% |
| Stoneground Whole Wheat Flour - Coarse | 40.0% |
| Grain Mix | 20.0% |
| Vital Wheat Gluten | 12.0% |
| Honey | 4.0% |
| Brown Sugar, Light | 6.0% |
| Salt | 2.0% |
| Yeast | 2.5% |
| Oven Springs #911 (Watson Foods) | 0.3% |
| Ascorbic Acid | 100 ppm |
| Water | 84.0% |
| Grain Mix | |
| Waxy Hulless Barley, cracked (Merlin) | 37.5% |
| Flaxseed, whole | 29.7% |
| Soy grits (full fat type) | 25.0% |
| Canola oil | 4.0% |
| Lecithin (Blendmax K, Central Soya) | 2.5% |
| Apple Extract (Herbapeck SF08) | 1.3% |
| GI VALUE (Glucose = 100) | 55 ± 3 |

Persons of ordinary skill in the art will appreciate that certain insubstantial modifications, alterations, and substitutions can be made to the described embodiments without departing from the scope of the invention, as recited in the accompanying claims.

What is claimed is:
1. A high satiety index baked bread product, comprising:
(1) a wheat flour product;
(2) a grain/seed source of soluble fiber; and
(3) a processed source of soluble fiber;
wherein the bread product has a total soluble fiber content of at least about 0.8% of the weight of the baked bread product on a 42% moisture basis and a total beta-glucan content of at least about 0.2% of the weight of the baked bread product on a 42% moisture basis, and wherein the amounts of the grain/seed source of soluble fiber and the processed source of soluble fiber are selected to provide an increased satiety index relative to a conventional white bread and wherein the amounts of the grain/seed source of soluble fiber and the processed source of soluble fiber are selected to provide a low glycemic index.

2. The high satiety index baked bread product of claim 1, wherein the wheat flour product comprises at least about 50% whole wheat flour based on the total weight of the wheat flour product.

3. The high satiety index baked bread product of claim 1, wherein the wheat flour product comprises 100% whole wheat flour based on the total weight of the wheat flour product.

4. The high satiety index baked bread product of claim 1, wherein the wheat flour product is included in the baked bread product in an amount ranging from about 30 wt. % to about 50% of the weight of the baked bread product.

5. The high satiety index baked bread product of claim 1, wherein the wheat flour product is included in the baked bread product in an amount ranging from about 40 wt. % to about 45% of the weight of the baked bread product.

6. The high satiety index baked bread product of claim 1, wherein the grain/seed source of soluble fiber is selected from the group consisting of wheat, rye, oats, barley, triticale, corn, soy, rice, flaxseeds, sunflower seeds, millet, buckwheat, amarath, spelt, almonds, hazelnuts, walnuts, pecans and mixtures thereof.

7. The high satiety index baked bread product of claim 1, wherein the grain/seed source of soluble fiber comprises at least one source high in beta-glucan selected from the group consisting of oat, oat bran, rye, barley, barley bran and flaxseed.

8. The high satiety index baked bread product of claim 1, wherein the grain/seed source of soluble fiber comprises waxy-hulless barley.

9. The high satiety index baked bread product of claim 1, wherein the processed source of soluble fiber is selected from the group consisting of refined gums, extracts high in pectin, herb extracts, beta-glucan extracts from grains and mixtures thereof.

10. The high satiety index baked bread product of claim 1, wherein the processed source of soluble fiber comprises apple pectin or apple pectin concentrate.

11. The high satiety index baked bread product of claim 1, wherein the processed source of soluble fiber comprises guar gum.

12. The high satiety index baked bread product of claim 1, wherein the processed source of soluble fiber comprises psyllium.

13. The high satiety index baked bread product of claim 1, further comprising at least one soy component selected from the group consisting of soy protein concentrate and soy protein isolate extruded into crisp pieces, clusters or nuggets.

14. The high satiety index baked bread product of claim 1 having a total soluble fiber content of at least about 1.0% of the weight of the baked bread product on a 42% moisture basis.

15. The high satiety index baked bread product of claim 1 having a total beta-glucan content of at least about 0.4% of the weight of the baked bread product on a 42% moisture basis.

16. The high satiety index baked bread product of claim 1 comprising a total dietary fiber content of at least about 6% of the weight of the baked bread product on a 42% moisture basis.

17. The high satiety index baked bread product of claim 1 comprising a total dietary fiber content of at least about 7% of the weight of the baked bread product on a 42% moisture basis.

18. The high satiety index baked bread product of claim 1, wherein the baked bread product is in the form of bread or a roll and has a density ranging from about 3.5 to about 4.5 cc/gram.

19. The high satiety index baked bread product of claim 18 having a density ranging from about 3.5 to about 4.0 cc/gram.

20. The high satiety index baked bread product of claim 1, wherein the baked bread product is in the form of a bagel and has a density ranging from about 2.5 to about 3.5 cc/gram.

21. The high satiety index baked bread product of claim 20 having a density ranging from about 2.75 to about 3.25 cc/gram.

22. The high satiety index baked bread product of claim 1 having a glycemic index value of 55 or less.

23. The high satiety index baked bread product of claim 22 having a glycemic index value of 50 or less.

24. The high satiety index baked bread product of claim 1, wherein the baked bread product contains an amount of grain, nuts, and/or seeds of sufficient size so that at least about 40% of the total weight of the grain, nuts and/or seeds in the bread product is retained by a sieve having a 12 US mesh sieve size.

25. The high satiety index baked bread product of claim 1, wherein the baked bread product contains an amount of grain, nuts, and/or seeds of sufficient size so that at least about 75% of the total weight of the grain, nuts and/or seeds in the composition is retained by a sieve having a 20 US mesh sieve size.

26. The high satiety index baked bread product of claim 1, wherein the baked bread product contains an amount of grain, nuts, and/or seeds of sufficient size so that at least about 95% of the total weight of the grain, nuts and/or seeds in the composition is retained by a sieve having a 20 US mesh sieve size.

27. The high satiety index baked bread product of claim 1, wherein:
the wheat flour product comprises at least about 50% whole wheat flour based on the total weight of the wheat flour product;
the grain/seed source of soluble fiber is selected from the group consisting of oat, oat bran, rye, barley, barley bran and flaxseed;
the processed source of soluble fiber is selected from the group consisting of psyllium, beta-glucan extracts, apple pectin, and apple pectin concentrate; and
the bread product has a total beta-glucan content of at least about 0.4% of the weight of the baked bread product on a 42% moisture basis.

28. A composition suitable for making a high satiety index bread product comprising:
(1) a wheat flour product;
(2) a grain/seed source of soluble fiber; and
(3) a processed source of soluble fiber;
wherein the composition contains an amount of grain, nuts, and/or seeds of sufficient size so that at least about 20% of the total weight of the grain, nuts and/or seeds in the composition is retained by a sieve having a 12 US mesh sieve size, and the amounts of the grain/seed source of soluble fiber and the processed source of soluble fiber are selected to provide an increased satiety index relative to a conventional white bread wherein the amounts of the grain/seed source of soluble fiber and the processed source of soluble fiber are selected to provide a low glycemic index.

29. The composition of claim 28, wherein the wheat flour product comprises at least about 50% whole wheat flour based on the total weight of the wheat flour product.

30. The composition of claim 28, wherein the wheat flour product comprises 100% whole wheat flour based on the total weight of the wheat flour product.

31. The composition of claim 28, wherein the grain/seed source of soluble fiber is selected from the group consisting of wheat, rye, oats, barley, triticale, corn, soy, rice, flaxseeds, sunflower seeds, millet, buckwheat, amarath, spelt, almonds, hazelnuts, walnuts, pecans and mixtures thereof.

32. The composition of claim 28, wherein the grain/seed source of soluble fiber comprises waxy-hulless barley.

33. The composition of claim 28, wherein the grain/seed source of soluble fiber comprises at least one source high in beta-glucan selected from the group consisting of oat, oat bran, rye, barley, barley bran and flaxseed.

34. The composition of claim 28, wherein the grain/seed source of soluble fiber is present in the composition in a total amount ranging from about 4 to about 12% of the weight of the composition.

35. The composition of claim 28, wherein the grain/seed source of soluble fiber is present in the composition in a total amount ranging from about 8 to about 10% of the weight of the composition.

36. The composition of claim 28, wherein the processed source of soluble fiber is selected from the group consisting of refined gums, extracts high in pectin, herb extracts, beta-glucan extracts from grains and mixtures thereof.

37. The composition of claim 28, wherein the processed source of soluble fiber comprises apple pectin or apple pectin concentrate.

38. The composition of claim 28, wherein the processed source of soluble fiber comprises guar gum.

39. The composition of claim 28, wherein the composition contains an amount of grain, nuts, and/or seeds of sufficient size so that at least about 40% of the total weight of the grain, nuts and/or seeds in the composition is retained by a sieve having a 12 US mesh sieve size.

40. The composition of claim 28, wherein the composition contains an amount of grain, nuts, and/or seeds of sufficient size so that at least about 75% of the total weight of the grain, nuts and/or seeds in the composition is retained by a sieve having a 20 US mesh sieve size.

41. The composition of claim 28, wherein the composition contains an amount of grain, nuts, and/or seeds of sufficient size so that at least about 95% of the total weight of the grain, nuts and/or seeds in the composition is retained by a sieve having a 20 US mesh sieve size.

42. The composition of claim 28, further comprising at least one additional ingredient selected from the group consisting of yeast, vital wheat gluten, sweetener, oil, lecithin, and salt.

43. The composition of claim 28, further comprising yeast.

44. The composition of claim 28 having a total soluble fiber content of at least about 0.7% of the weight of the composition.

45. The composition of claim 28 having a total soluble fiber content of at least about 0.9% of the weight of the composition.

46. The composition of claim 28 having a total beta-glucan content of at least about 0.2% of the weight of the composition.

47. The composition of claim 28 having a total beta-glucan content of at least about 0.4% of the weight of the composition.

48. The composition of claim 28, the low glycemic index value being about 55 or less.

49. The composition of claim 48, the low glycemic index value being about 50 or less.

50. A baked bread product having a high satiety index and a low glycemic index, comprising:

(1) a wheat flour product;

(2) a grain/seed source of soluble fiber; and (3) a processed source of soluble fiber;

wherein the bread product has a total soluble fiber content of at least about 0.8% of the weight of the baked bread product on a 42% moisture basis and a total beta-glucan content of at least about 0.2% of the weight of the baked bread product on a 42% moisture basis, and wherein the amounts of the grain/seed source of soluble fiber and the processed source of soluble fiber are selected to provide both an increased satiety index relative to a conventional white bread and a glycemic index being about 55 or less.

* * * * *